US012566598B2

(12) United States Patent
Hasuo et al.

(10) Patent No.: US 12,566,598 B2
(45) Date of Patent: Mar. 3, 2026

(54) SAMPLING DEVICE AND SAMPLING METHOD

(71) Applicant: INTER-UNIVERSITY RESEARCH INSTITUTE CORPORATION RESEARCH ORGANIZATION OF INFORMATION AND SYSTEMS, Tokyo (JP)

(72) Inventors: Ichiro Hasuo, Tokyo (JP); Yuichiro Oyabu, Tokyo (JP); Clovis Eberhart, Tokyo (JP); Kohei Suenaga, Tokyo (JP); Kenta Cho, Tokyo (JP); Shinya Katsumata, Tokyo (JP)

(73) Assignee: INTER-UNIVERSITY RESEARCH INSTITUTE CORPORATION RESEARCH ORGANIZATION OF INFORMATION AND SYSTEMS, Tokyo (JP)

( * ) Notice: Subject to any disclaimer, the term of this patent is extended or adjusted under 35 U.S.C. 154(b) by 260 days.

(21) Appl. No.: 18/338,078

(22) Filed: Jun. 20, 2023

(65) Prior Publication Data

US 2023/0333829 A1 Oct. 19, 2023

Related U.S. Application Data

(63) Continuation of application No. PCT/JP2021/047811, filed on Dec. 23, 2021.

(30) Foreign Application Priority Data

Dec. 28, 2020 (JP) ................................. 2020-218906

(51) Int. Cl.
| | |
|---|---|
| *G06F 8/40* | (2018.01) |
| *G06F 8/41* | (2018.01) |
| *G06F 9/30* | (2018.01) |

(52) U.S. Cl.
CPC .......... *G06F 8/443* (2013.01); *G06F 9/30058* (2013.01)

(58) Field of Classification Search
CPC ....................................................... G06F 8/40
See application file for complete search history.

(56) References Cited

U.S. PATENT DOCUMENTS

| | | | | |
|---|---|---|---|---|
| 5,640,509 | A * | 6/1997 | Balmer .................. | G11C 29/50 |
| | | | | 365/201 |
| 2009/0227251 | A1* | 9/2009 | Lei ........................ | H04W 24/08 |
| | | | | 455/425 |
| 2009/0319458 | A1 | 12/2009 | Minka et al. | |
| 2010/0070953 | A1* | 3/2010 | Velten .................. | G06F 21/123 |
| | | | | 717/140 |

(Continued)

OTHER PUBLICATIONS

Bernstein ("Transforming Probabilistic Programs for Model Checking"), Aug. 2020, (Year: 2020).*

(Continued)

*Primary Examiner* — Jae U Jeon
(74) *Attorney, Agent, or Firm* — IPUSA, PLLC

(57) ABSTRACT

A sampling device includes a memory and a processor configured to execute selecting a control flow corresponding to each branch in a probabilistic program; optimizing the program by applying predetermined transformation rules to the program of the selected control flow by back propagation; and generating samples according to the optimized program.

8 Claims, 14 Drawing Sheets

(56) References Cited

U.S. PATENT DOCUMENTS

| | | | |
|---|---|---|---|
| 2013/0036082 A1* | 2/2013 | Natarajan | G06Q 30/00 |
| | | | 706/50 |
| 2015/0095277 A1 | 4/2015 | Tristan et al. | |
| 2016/0063390 A1 | 3/2016 | Mytkowicz et al. | |
| 2017/0132513 A1* | 5/2017 | Yu | G06N 3/08 |

OTHER PUBLICATIONS

Aditya V. Nori and Chung-Kil Hur, 'R2: an efficient MCMC sampler for probabilistic programs,' AAAI'14: Proceedings of the Twenty-Eighth AAAI Conference on Artificial Intelligence, Jul. 2014, pp. 2476-2482.

Yuan Zhou, Hongseok Yang, Yee Whye Teh and Tom Rainforth, 'Divide, Conquer, and Combine: a New Inference Strategy for Probabilistic Programs with Stochastic Support', <https://arxiv.org/pdf/1910.13324.pdf>, arXiv:1910.13324v3 [stat.ML] Jul. 16, 2020.

International Search Report for PCT/JP2021/047811 mailed on Mar. 1, 2022.

Extended European Search Report mailed on Apr. 24, 2024 with respect to the corresponding European patent application No. 21915192.5.

Ryan Bernstein et al: "Transforming Probabilistic Programs for Model Checking", arxiv.org, Cornell University Library, 201 Olin Library Cornell University Ithaca, NY 14853, Aug. 21, 2020 (Aug. 21, 2020), XP081746433, DOI: 10.1145/3412815.3416896.

Tuan Anh Le et al: "Inference Compilation and Universal probabilistic Programming", arxiv.org, Cornell University Library, 201 Olin Library Cornell University Ithaca, NY 14853, Oct. 31, 2016 (Oct. 31, 2016), XP081399002.

William Harvey et al: "Attention for Inference Compilation", arxiv.org, Cornell University Library, 201 Olin Library Cornell University Ithaca, NY 14853, Oct. 26, 2019 (Oct. 26, 2019), XP081521273.

Dutta Saikat SAIKATD2@Illinois Edu et L: "Storm: program reduction for testing and debugging probabilistic programming systems", Proceedings of the 2019 27th ACM Joint Meeting on European Software Engineering Conference and Symposium on the Fondations of Software Engineering, ACMPUB27, New York, NY, USA, Aug. 12, 2019 (Aug. 12, 2019), pp. 729-739, XP058458760, DOI: 10.1145/3338906.3338972 ISBN: 978-1-4503-5572-8.

* cited by examiner

FIG.2

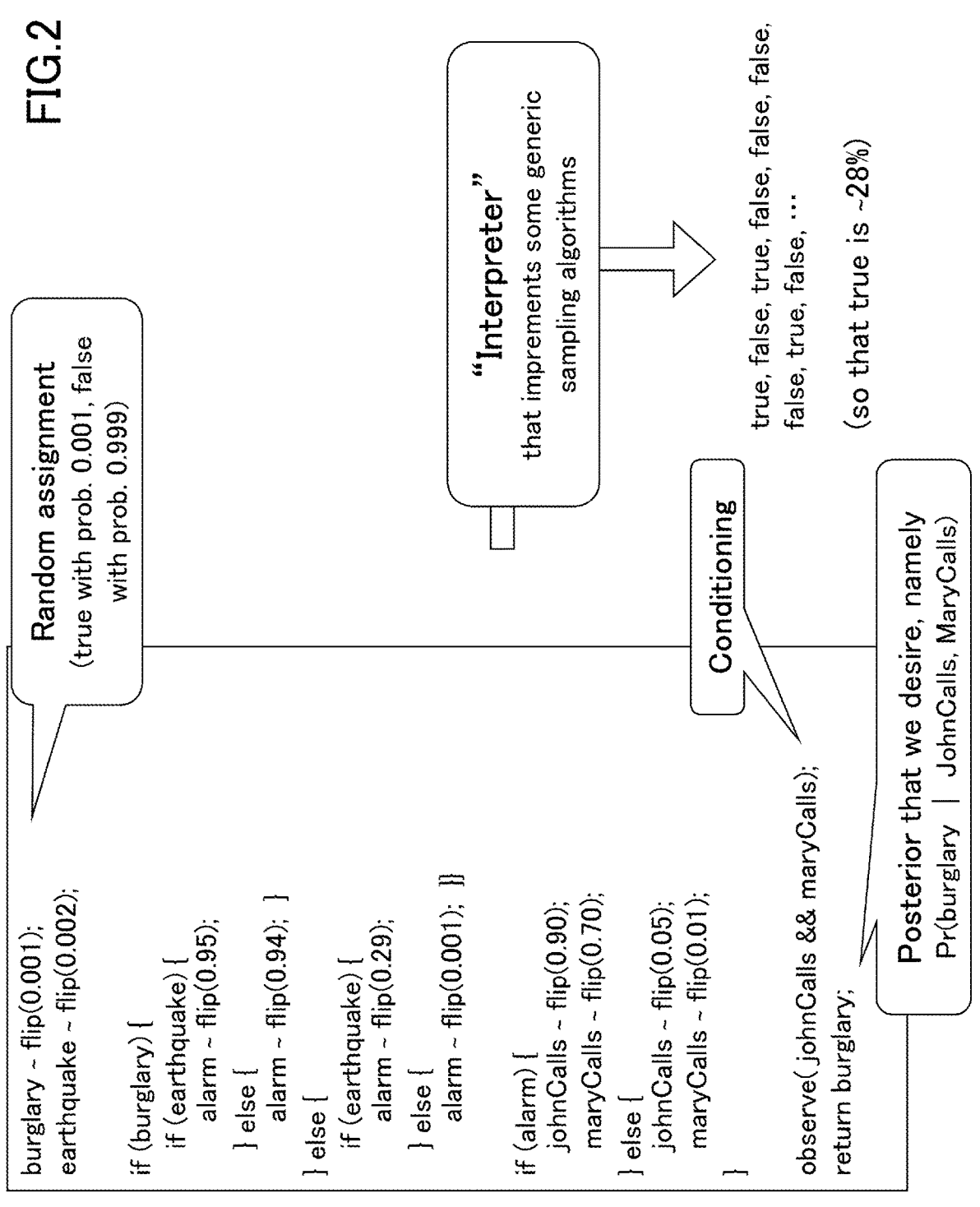

Random assignment
(true with prob. 0.001, false
with prob. 0.999)

burglary ~ flip(0.001);
earthquake ~ flip(0.002);

if (burglary) {
  if (earthquake) {
    alarm ~ flip(0.95);
  } else {
    alarm ~ flip(0.94); }
} else {
  if (earthquake) {
    alarm ~ flip(0.29);
  } else {
    alarm ~ flip(0.001); }} if (alarm) {
  johnCalls ~ flip(0.90);
  maryCalls ~ flip(0.70);
} else {
  johnCalls ~ flip(0.05);
  maryCalls ~ flip(0.01);
} observe(johnCalls && maryCalls);
return burglary;

Conditioning

Posterior that we desire, namely
Pr(burglary | JohnCalls, MaryCalls)

"Interpreter"
that imprements some generic
sampling algorithms true, false, true, false, false, false,
false, true, false, ...

(so that true is ~28%)

```
z0 ~ uniform(-4, 4);

if (z0 < 0) {
    y ~ beta(1, 1);
    z := z0 + y;
} else {
    y ~ gamma(2, 2);
    z := z0 + y;
} observe(0 <= z <= 2);
return z;
```

```
...
weight(g);
[[ f ]]
...
```
⇨
```
...
[[ f x g ]]
...
```

FIG.10

```
...
x ~ Dist(e);
[[ f ]]
...
```

⇒

```
...
[[ f ]]
x ~ Dist(e);
...
```

```
...
x ~ Dist(e);
[[ f ]]
...
```

⇒

```
...
[[ char( ψ ) ]]
x ~ Dist(e);
weight f;
...
```

```
...
x ~ Dist(e);
[[ f ]]
...
```

⇒

```
...
[[ char( ψ ) ]]
x ~ (Dist(e) | ξ );
weight(p( ξ | x ~ Dist(e)));
weight(f);
...
```

FIG.13

```
m ~ poisson (6);
x = 0;
n = m;

while (0 < n) {
  y ~ unif (1 , 1.25);
   x = x + y; n = n − 1;
} observe (x >= 30);
return m;
```

SAMPLING DEVICE AND SAMPLING METHOD

CROSS-REFERENCE TO RELATED APPLICATIONS

This U.S. non-provisional application is a continuation application of and claims the benefit of priority under 35 U.S.C. § 365(c) from PCT International Application PCT/JP2021/047811 filed on Dec. 23, 2021, which is designated the U.S., and is based upon and claims the benefit of priority to Japanese Patent Application No. 2020/218906 filed on Dec. 28, 2020, the entire contents of which are incorporated herein by reference.

BACKGROUND OF THE INVENTION

1. Field of the Invention

The present disclosure relates to a sampling device and a sampling method.

2. Description of the Related Art

Bayesian inference is a statistical method of inferring a matter (a causal event that is a cause of it) estimated from an observed event (an observed fact) in a probabilistic sense. For example, Bayesian inference is applied to many fields including rocket control, automatic driving, collision avoidance, spam mail filtering, medical interview, achievement test, speech analysis and synthesis, genome analysis, astronomy, psychology, drug discovery, materials, energy, semantic search, internet shopping promotion, deep learning, and the like.

Probabilistic programming (PPL) is used for implement Bayesian inference. By using probabilistic programming, a statistical model can be expressed in a form of a program, and various techniques can be provided for statistical model analysis.

As a statistical model, a framework based on sampling is often used. For example, as sampling methods, Sequential Monte Carlo method (SMC), Markov chain Monte Carlo method (MCMC), variational inference (VI), and the like have been known.

RELATED ART DOCUMENTS

Non-Patent Documents

[Non-Patent Document 1] Aditya V. Nori and Chung-Kil Hur, 'R2: an efficient MCMC sampler for probabilistic programs,' AAAI '14: Proceedings of the Twenty-Eighth AAAI Conference on Artificial Intelligence, July 2014, pp 2476-2482

[Non-Patent Document 2] Yuan Zhou, Hongseok Yang, Yee Whye Teh and Tom Rainforth, 'Divide, Conquer, and Combine: a New Inference Strategy for Probabilistic Programs with Stochastic Support', (https://arxiv.org/pdf/1910.13324.pdf)

SUMMARY

According to one aspect of the present invention, a sampling device includes a memory and a processor configured to execute selecting a control flow corresponding to each branch in a probabilistic program; optimizing the program by applying predetermined transformation rules to the program of the selected control flow by back propagation; and generating samples according to the optimized program.

BRIEF DESCRIPTION OF DRAWINGS

FIG. 2 is a code diagram illustrating a probabilistic program for Bayesian inference;

FIG. 9 is a schematic diagram illustrating transformation rules for probabilistic programming according to one embodiment in the present disclosure;

FIG. 10 is a schematic diagram illustrating transformation rules for probabilistic programming according to one embodiment in the present disclosure;

FIG. 13 is a code diagram illustrating a probabilistic program according to one embodiment in the present disclosure.

DESCRIPTION OF THE PREFERRED EMBODIMENTS

In the following embodiments, a sampling device for probabilistic programming is disclosed.

According to the present disclosure, a new sampling method for probabilistic programming can be provided.

[Bayesian Inference and Probabilistic Programming]

Figure 1:
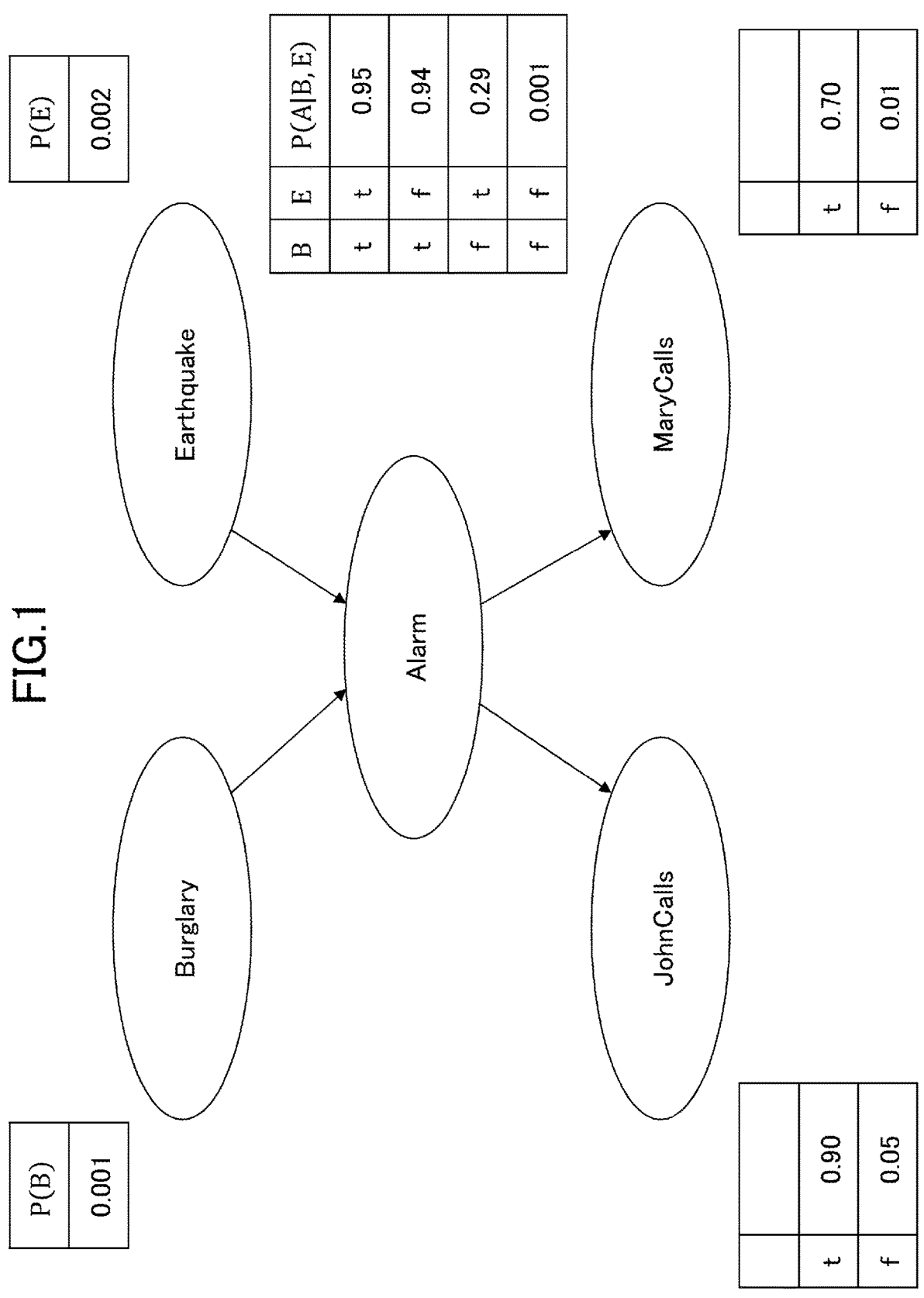
FIG. 1 is a schematic diagram illustrating an example of Bayesian inference.

Bayesian inference is to derive a posterior distribution $P(X|D)$ from a prior distribution $P(X)$ and a conditional distribution $P(D|X)$ according to Bayes' theorem. For example, a probability model for Bayesian inference may be described by a Bayesian network as illustrated in FIG. 1. By Bayesian inference, from the illustrated Bayesian network, for example, in the case where both an event that John made a report (JohnCalls) and an event that Mary John made a report (MaryCalls) have occurred (JohnCalls=true&MaryCalls=true), a probability $P(B|JohnCalls=true\&MaryCalls=true)$ of an occurrence of burglary as a posterior probability can be derived. In the illustrated example, the probability is $P(B|JohnCalls=true\&MaryCalls=true)=P(JohnCalls=true\&MaryCalls=true|B)\cdot P(B)/P(JohnCalls=true\&MaryCalls=true)\approx 0.2841$.

Probabilistic programming is used for implementing such Bayesian inference. The probability model illustrated in FIG. 1 can be described as a probabilistic program, for example, as illustrated in FIG. 2. Here, the desired posterior probability P(B|JohnCalls=true&MaryCalls=true) can be output by 'return burglary' in the case where 'observe (johnCalls && maryCalls)' is satisfied in the illustrated probabilistic program.

Although in the illustrated probabilistic program, a flip function that returns a Boolean value at random is used, in probabilistic programming, sampling functions that follow various probability distributions can be used. For example, in a probabilistic program illustrated in FIG. 3, a sampling function "uniform" that follows a uniform distribution, a sampling function "beta" that follows a beta distribution, and a sampling function "gamma" that follows a gamma distribution are used. Further, the process branches depending on whether a parameter $z0$ is negative or non-negative, and bifurcates into a control flow in which the beta function is used and a control flow in which the gamma function is used. However, in the case where multiple different probability distributions are used in this way, there may be a problem of lack of smoothness of the probability distribution between the control flows. In this case, in an MCMC method that obtains a target distribution by moving at random, it is difficult to determine timing of switching the probability distribution; also, in a VI method that uses a distribution template to be applied to data, it is difficult to find a template suitable for a distribution lacking smoothness.

Figure 4:
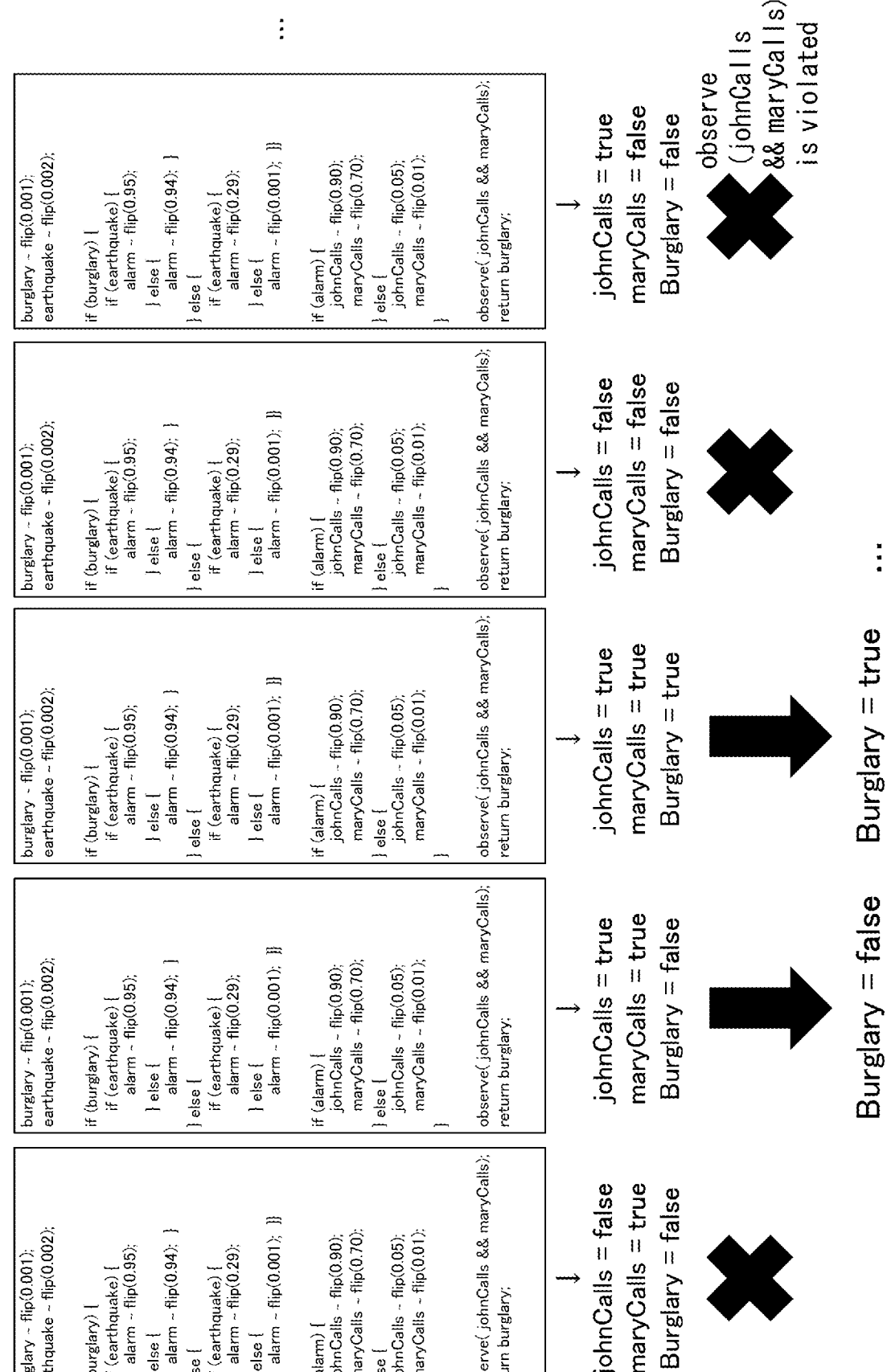
FIG. 4 is a schematic diagram illustrating sampling results of a probabilistic program.

In addition, in the probabilistic program illustrated in FIG. 2, JohnCalls=true&MaryCalls=true is an event that rarely occurs, and as illustrated in FIG. 4, samples in which 'observe(johnCalls&&maryCalls)' occurs are rarely generated. In other words, most of the samples generated are not used, which is a waste of computational resources.

[Overview]

Figure 5:
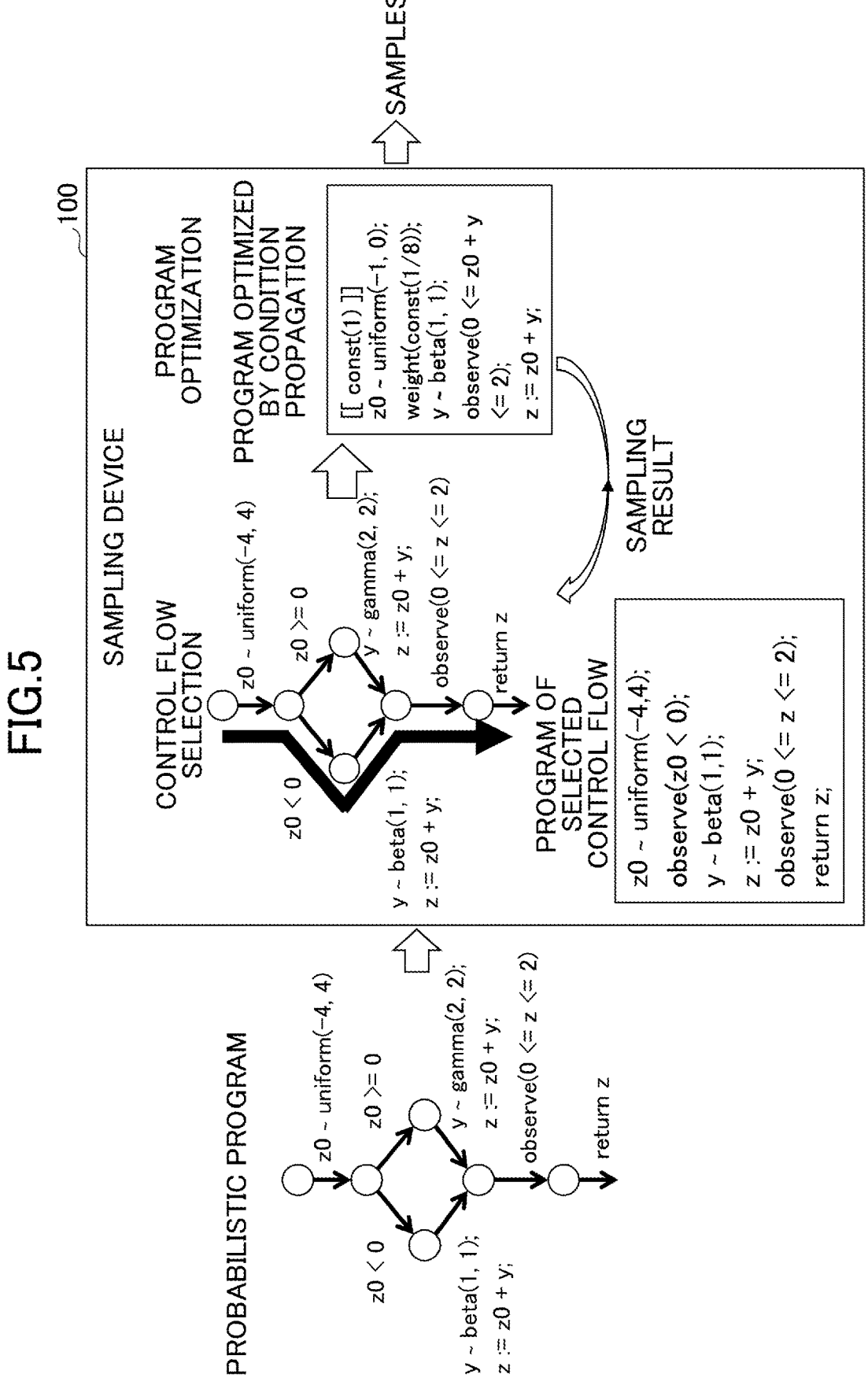
FIG. 5 is a schematic diagram illustrating a sampling device according to one embodiment in the present disclosure.

As illustrated in FIG. 5, upon receiving a probabilistic program, a sampling device 100 according to one embodiment in the present disclosure extracts multiple control flows by focusing on a conditional branch structure such as an if statement in the received probabilistic program. Further, the sampling device 100 selects one of the control flows, optimizes the program of the selected control flow according to condition propagation that will be described later, and generates samples according to the optimized program. In this condition propagation, the program is transformed according to predetermined transformation rules so as to exclude sampling that does not logically satisfy an establishing condition of "observe". Then, the sampling device 100 selects a next control flow based on a sampling result, optimizes the program of the similarly selected control flow, and generates samples according to the optimized program.

Figure 6:
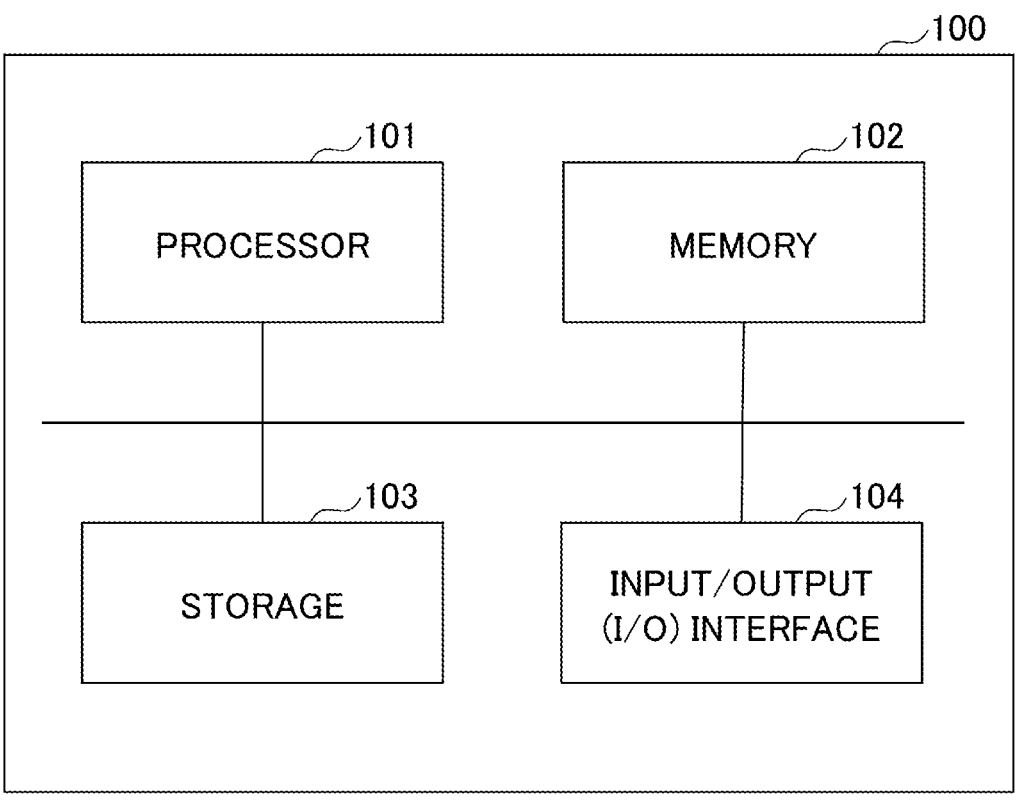
FIG. 6 is a block diagram illustrating a hardware configuration of a sampling device according to one embodiment in the present disclosure.

Here, for example, as illustrated in FIG. 6, the sampling device 100 may have a hardware configuration that includes a processor 101 such as a central processing unit (CPU), a memory 102 such as a random access memory (RAM) or a flash memory, a storage 103, and an input/output (I/O) interface 104.

The processor 101 executes various processes of the sampling device 100 as will be described later.

The memory 102 stores various items of information and programs in the sampling device 100, and in particular, functions as a working memory for working information, programs under execution, and the like. Specifically, the memory 102 stores a program loaded from the hard disk 103 for executing and controlling various processes that will described later, and functions as a working memory during the course of execution of the program by the processor 101.

The hard disk 103 stores various items of information and programs in the sampling device 100.

The I/O interface 104 is an interface for receiving a command, input data, and the like from a user, displaying and reproducing an output result, and inputting and outputting data to and from an external device. For example, the I/O interface 104 may be a device for inputting and outputting various types of data, such as a universal serial bus (USB), a communication line, a keyboard, a mouse, a display, a microphone, and a speaker.

However, the sampling device 100 according to the present disclosure is not limited to the hardware configuration described above, and may have any other suitable hardware configuration. For example, one or more of various types of processes executed by the sampling device 100 may be implemented by processing circuitry or electronic circuitry wired to implement the processes.

[Sampling Device]

Figure 7:
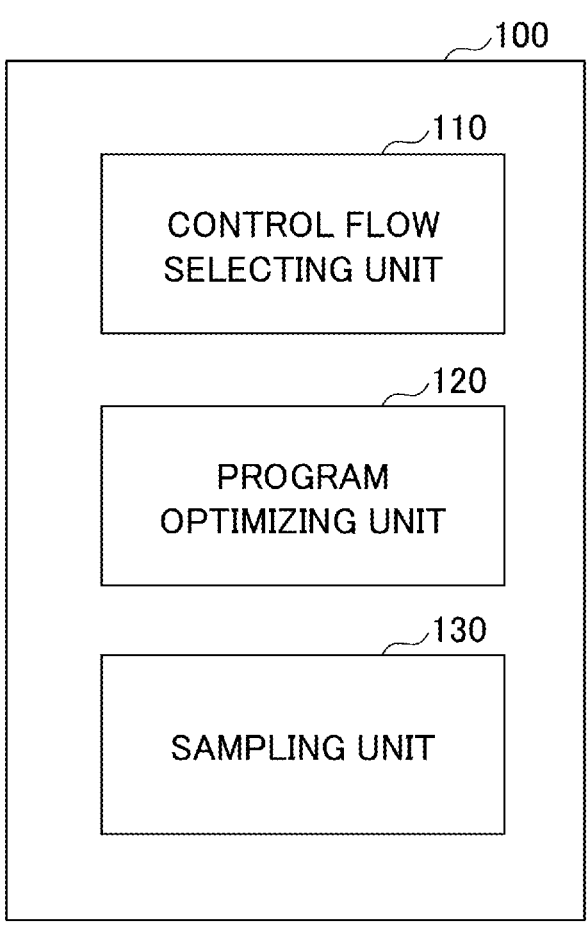
FIG. 7 is a block diagram illustrating a functional configuration of a sampling device according to one embodiment in the present disclosure.

Next, with reference to FIGS. 7 to 13, the sampling device 100 according to one embodiment in the present disclosure will be described. FIG. 7 is a block diagram illustrating a functional configuration of the sampling device 100 according to one embodiment in the present disclosure.

As illustrated in FIG. 7, the sampling device 100 includes a control flow selecting unit 110, a program optimizing unit 120, and a sampling unit 130.

Figure 3:
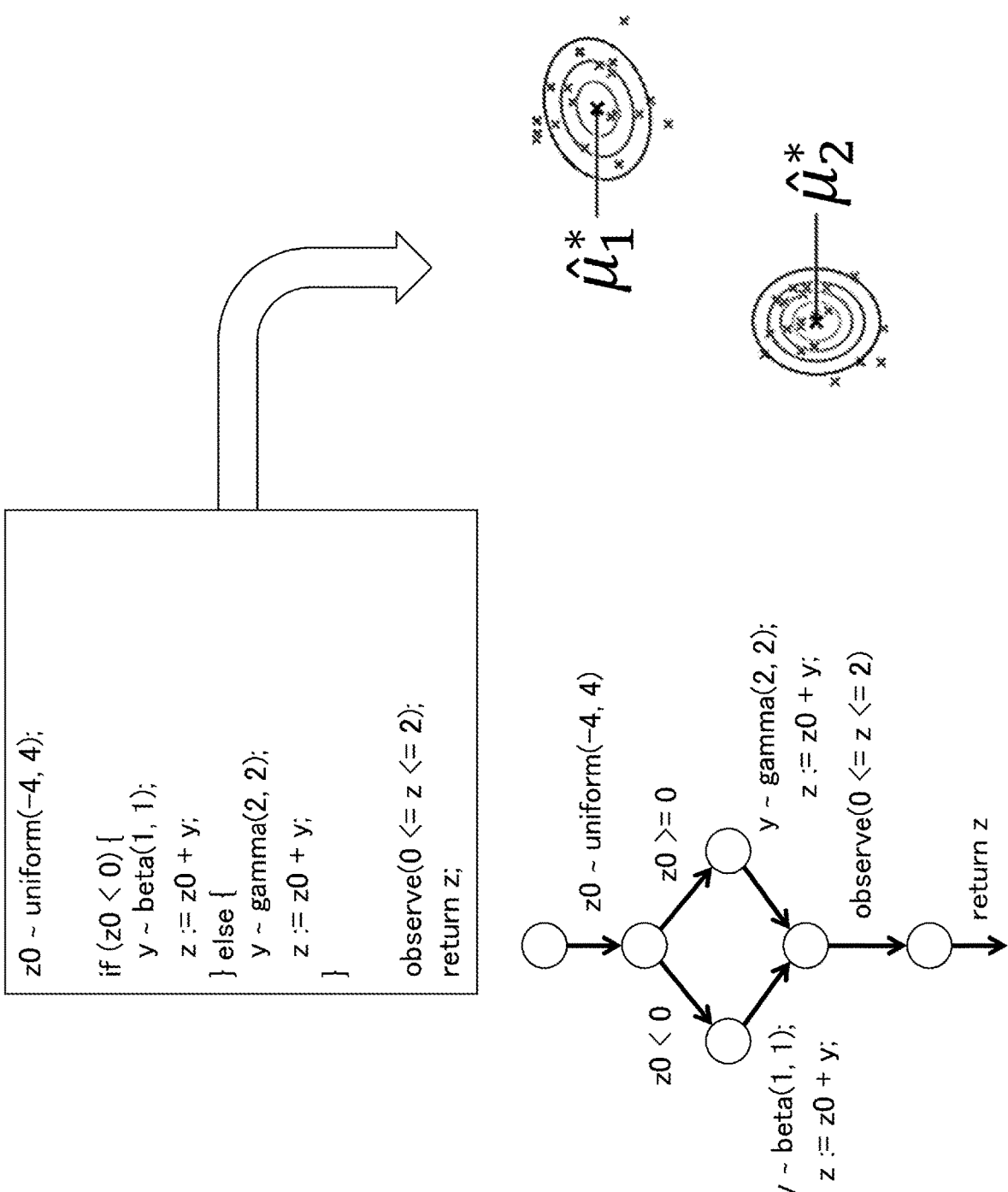
FIG. 3 is a schematic diagram illustrating different distributions in a probabilistic program.
Figure 8:
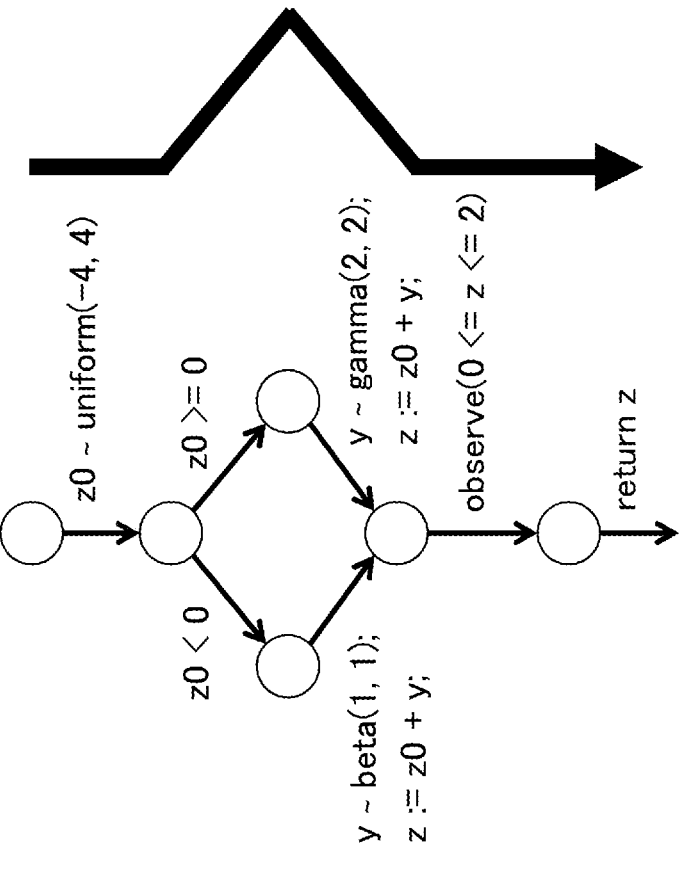
FIG. 8 is a schematic diagram illustrating control flows according to one embodiment in the present disclosure.

The control flow selecting unit 110 selects a control flow corresponding to each branch of a probabilistic program. Specifically, when a probabilistic program to be processed is given, the control flow selecting unit 110 identifies a control structure related to branches such as if statements in the probabilistic program, and extracts processing paths (control flows) corresponding to the respective branches of the probabilistic program. For example, when a probabilistic program that includes one if statement as illustrated in FIG. 3 is given, the control flow selecting unit 110 identifies the if statement, and extracts control flows 1 and 2 as illustrated in FIG. 8. Here, the control flow 1 corresponds to a processing path in the case where the condition '$z0<0$' in the if statement is true, and the beta function is used as the sampling function. On the other hand, the control flow 2 corresponds to a processing path in the case where the condition '$z0<0$' in the if statement is false, and the gamma function is used as the sampling function.

Once having extracted the respective control flows in the probabilistic program, the control flow selecting unit 110 constructs a serial program of each of the control flows from the probabilistic program. For example, as a serial program corresponding to the control flow 1, the control flow selecting unit 110 replaces 'if($z0<0$)' with 'observe($z0<0$)' in the probabilistic program as illustrated in FIG. 5. Although not illustrated, as a serial program corresponding to the control flow 2, the control flow selecting unit 110 similarly replaces 'if($z0≥0$)' with 'observe($z0≥0$)' in the probabilistic program.

In this way, after having constructed the serial programs for the respective control flows, the control flow selecting unit 110 selects one of the extracted control flows, and passes the selected one to the program optimizing unit 120. Initially, the control flow selecting unit 110 may select one of the control flows at random. Thereafter, the control flow selecting unit 110 may select the next control flow based on a sampling result by the optimized program as will be described later.

The program optimizing unit 120 optimizes the program, by applying predetermined transformation rules to the program of the selected control flow by back propagation. Specifically, once having obtained a control flow from the control flow selecting unit 110, the program optimizing unit 120 sequentially applies the predetermined transformation rules in a direction opposite to the processing order of the serial program of the obtained control flow, and transforms instructions of lines from the bottom line to the top line of the program, to optimize the program. For example, the program optimizing unit 120 transforms each line of the program in the direction opposite to the processing order using a roller that scans the program from the bottom line to the top line. The roller has an internal state, and transforms each line of the program according to transformation rules that will be described later, while causing the internal state to transition as scanning proceeds.

As a first transformation rule, when the line to be transformed is 'return x', the program optimizing unit 120 deletes the line, and sets the internal state to 'const(1)'. Here, 'const(1)' is a function that always returns a value 1. For example, when the line to be transformed is 'return z', the transformation rule transforms the line to 'const(1)', and sets the internal state to 'const(1)'.

As a second transformation rule, when the line to be transformed is a deterministic substitution instruction 'x:=e', the program optimizing unit 120 replaces the internal state f with 'f[e/x]', and maintains 'x:=e' as illustrated in FIG. 9. Here, 'f[e/x]' is obtained by replacing the variable x in f with e. For example, when the line to be transformed is 'z:=z0+y' and the internal state is 'char(0<=z<=2)', the transformation rule maintains the line, and sets the internal state to 'char(0<=z0+y<=2)'. Here, 'char(x)' is a characteristic function of a logical expression x, that returns 1 if x is true, or 0 otherwise.

As a third transformation rule, when the line to be transformed is a weighting instruction 'weight(g)', the program optimizing unit 120 replaces the internal state f with 'f×g', and deletes 'weight(g)' as illustrated in FIG. 9. Here, 'f×g' is a function that returns the product of the output value of the function f and the output value of the function g. In addition, 'observe(x)' is an abbreviation for 'weight(char (x))'. For example, when the line to be transformed is 'observe(z0<0)' and the internal state is 'char(−1<=z0<=2)', the transform rule deletes the line, and sets the internal state to 'char((−1<=z0<=2)∧(z0<0))=char(−1<=z0<0)'.

As a fourth transformation rule, when the line to be transformed is a probabilistic substitution instruction 'x~Dist(e)', and x does not appear in the internal state f, the program optimizing unit 120 maintains the instruction and internal state as illustrated in FIG. 10.

As a fifth transformation rule, when the line to be transformed is a probabilistic substitution instruction 'x~Dist(e)', and x appears in the internal state f, the program optimizing unit 120 sets the internal state f to 'char(ψ)', maintains the instruction, and adds 'weight f' as illustrated in FIG. 10. As x is involved in the internal state f, the internal state f needs to be used for weighting (weight f). ψ may be any logical expression that satisfies the following formula:

$$(\exists x \in \mathrm{supp}(\mathrm{Dist}(\vec{e}) \cdot f > 0) \Rightarrow \psi \qquad \text{[Math. 1]}$$

where ψ needs to be a Boolean logical expression rather than a fuzzy predicate.

Here, as a method of selecting ψ, a logical expression $$(\exists x \in \mathrm{supp}(\mathrm{Dist}(\vec{e})) \cdot f > 0 \qquad \text{[Math. 2]}$$

may be set to ψ. However, a quantifier ∃ makes logical operations very difficult. ψ may also be set to true. However, as this setting has no amount of information, and hence, eliminates the effect of omitting unnecessary samples, True is selected only in the case where the following selection method cannot be applied. Therefore, if it is assumed that f·>0 being true is monotonic with respect to x, i.e. f·(x1)>0 and x1≤x2 means f·(x2)>0, and further, the following formula has an upper bound xsup, $$\mathrm{supp}(\mathrm{Dist}(\vec{e})) \qquad \text{[Math. 3]}$$

ψ is selected to be f (xsup)>0. For example, when the line to be transformed is 'y~beta(1,1)' and the internal state is 'char(0<=z0+y)', the transformation rule maintains the line, and sets the internal state to 'char(0<=z0+1)'.

Further, as an improved version of the fifth transformation rule, when the line to be transformed is a probabilistic substitution instruction 'x~Dist(e)', and x appears in the internal state f, efficiency can be improved by what-is-called region restriction. In the case where the improved version can be applied, i.e., in the case where ξ and ψ satisfying a condition that will be described later are found, the improved version may be applied, or otherwise, the fifth transformation rule described above may be applied. If the logical expressions ξ and ψ satisfy the following condition, $$(\forall x \in \mathrm{supp}(\mathrm{Dist}(\vec{e}) \cdot (f > 0) \Rightarrow \xi), (\exists x \in \mathrm{supp}(\mathrm{Dist}(\vec{e})) \cdot f > 0) \Rightarrow \omega \qquad \text{[Math. 4]}$$

as illustrated in FIG. 10, the program optimizing unit 120 sets the internal state f to 'char(ψ)', replaces the instruction with 'x~(Dist(e)|ξ', and adds 'weight(P(ξ|x~Dist(e))' and 'weight(f)'. Here, 'Dist(e)|ξ' is a probability distribution obtained by restricting the probability distribution 'Dist(e)' to a region where holds, and 'p(ξ|x~Dist(e)' is a probability that x selected along Dist(e) makes ξ true.

Figure 11:
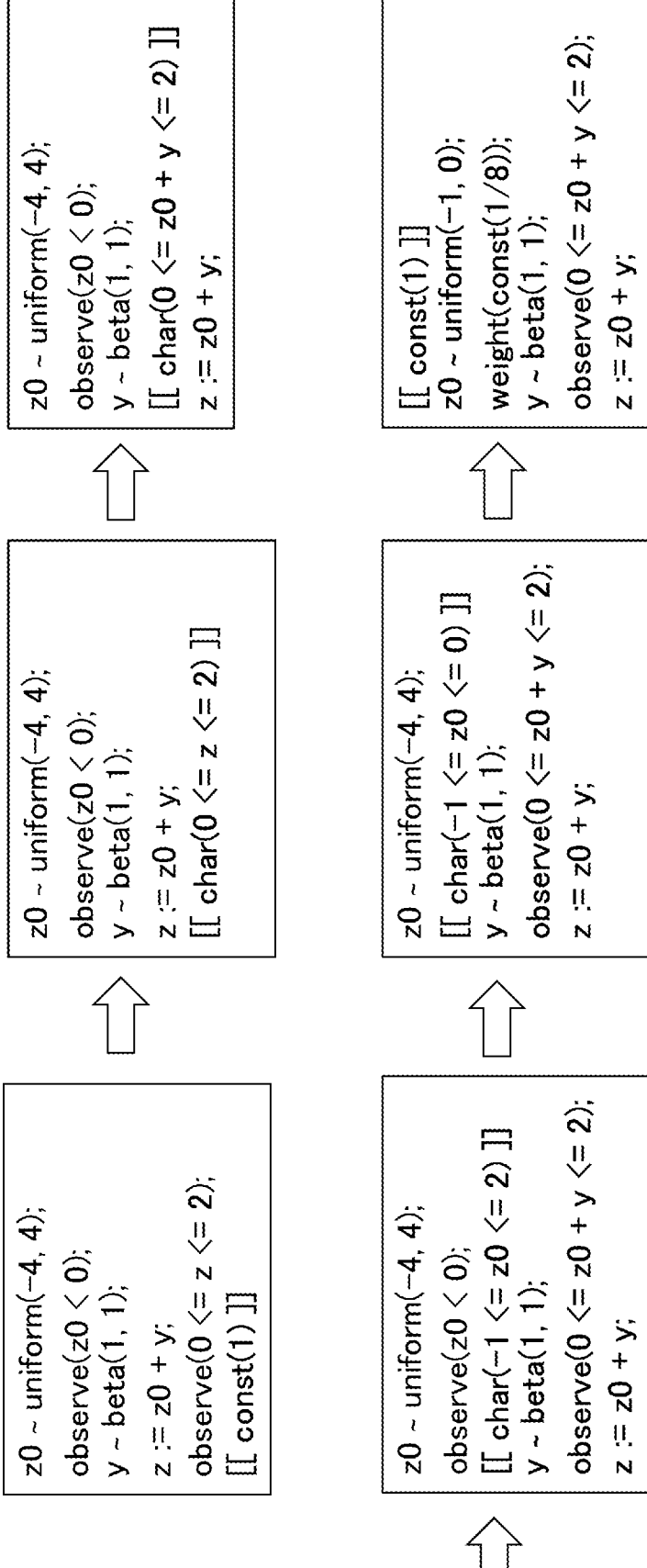
FIG. 11 is a schematic diagram illustrating a process of transforming a probabilistic program according to one embodiment in the present disclosure.

For example, the program optimizing unit 120 applies the transformation rules described above to optimize the serial program of the control flow 1 as illustrated in FIG. 11.

First, the program optimizing unit 120 applies the first transformation rule to the bottom line 'return z' in the serial program, and sets the internal state to 'const(1)', and deletes the line.

Next, the program optimizing unit 120 applies the third transformation rule to 'observe(0<=z<=2)' in the serial program, and sets the internal state to 'char(0<=z<=2)', and deletes the line.

Next, the program optimizing unit 120 applies the second transformation rule to 'z:=z0+y' in the serial program, and sets the internal state to 'char(0<=z0+y<=2)', and maintains the line 'z:=z0+y'.

Next, the program optimizing unit 120 applies the fifth transformation rule to 'y~beta(1,1)' in the serial program, and sets the internal state to 'char(−1<=z0<=2)', and transforms the line into 'y~beta(1,1)' and 'observe(0<=z0+y<=2) '.

Next, the program optimizing unit 120 applies the third transformation rule to 'observe(z0<0)' in the serial program, and sets the internal state to 'char(−1<=z0<0)' (=char((−1<=z0<=2)∧(z0<0))), and deletes the line.

Finally, the program optimizing unit 120 applies the improved version of the fifth transformation rule to the topmost line 'z0~uniform (−4,4)' in the serial program, and sets the internal state to 'const(1)', and transforms the line into 'z0~uniform(−1,0)' and 'weight(const(⅛)'. ψ in the transformation rule described above is True, and char(ψ) is always 1, i.e., const(1). In addition, x in the transformation rule corresponds to z0, and ξ corresponds to −1<=z0<=0. Dist(e) is uniform(−4,4), Dist(e)|ξ is uniform(−1,0), and $P(\xi|x\sim\text{Dist}(e))$ is a probability that satisfies $-1<=z0<=0$ when z0 is selected from uniform $(-4,4)$, which is $\frac{1}{8}$.

The program optimizing unit 120 passes the optimized program to the sampling unit 130.

The sampling unit 130 generates samples according to the optimized program. Specifically, the sampling unit 130 generates a predetermined number of samples according to the optimized program of the serial program of the selected control flow. The generated samples, in which samples that do not logically contribute to calculation of the output of the serial program are excluded in advance, improve the sampling efficiency. Once having generated the predetermined number of samples, the sampling unit 130 causes the control flow selecting unit 110 to select the next control flow. For example, the next control flow may be selected randomly, or may be an unselected control flow. Similarly, the program optimizing unit 120 optimizes the serial program of the selected control flow, and the sampling unit 130 generates the predetermined number of samples according to the optimized program.

For the samples pooled in this way, the sampling unit 130 calculates the likelihood of the samples generated for the respective control flows, and informs the control flow selecting unit 110 of the calculated likelihood as a sampling result. Here, the likelihood of a sample is the product of weights given by the respective weighting instructions that are passed through when the sample was generated. As 'observe (x)' is an abbreviation of 'weight(char(x))', in the case where the sample does not satisfy the logical expression x when passing through the instruction of 'observe(x)', the likelihood of the sample is 0. The control flow selecting unit 110 may select a control flow based on the obtained likelihood. For example, the control flow selecting unit 110 may select a control flow having a relatively high likelihood with a high probability, and a control flow having a relatively low likelihood with a low probability.

Figure 12:
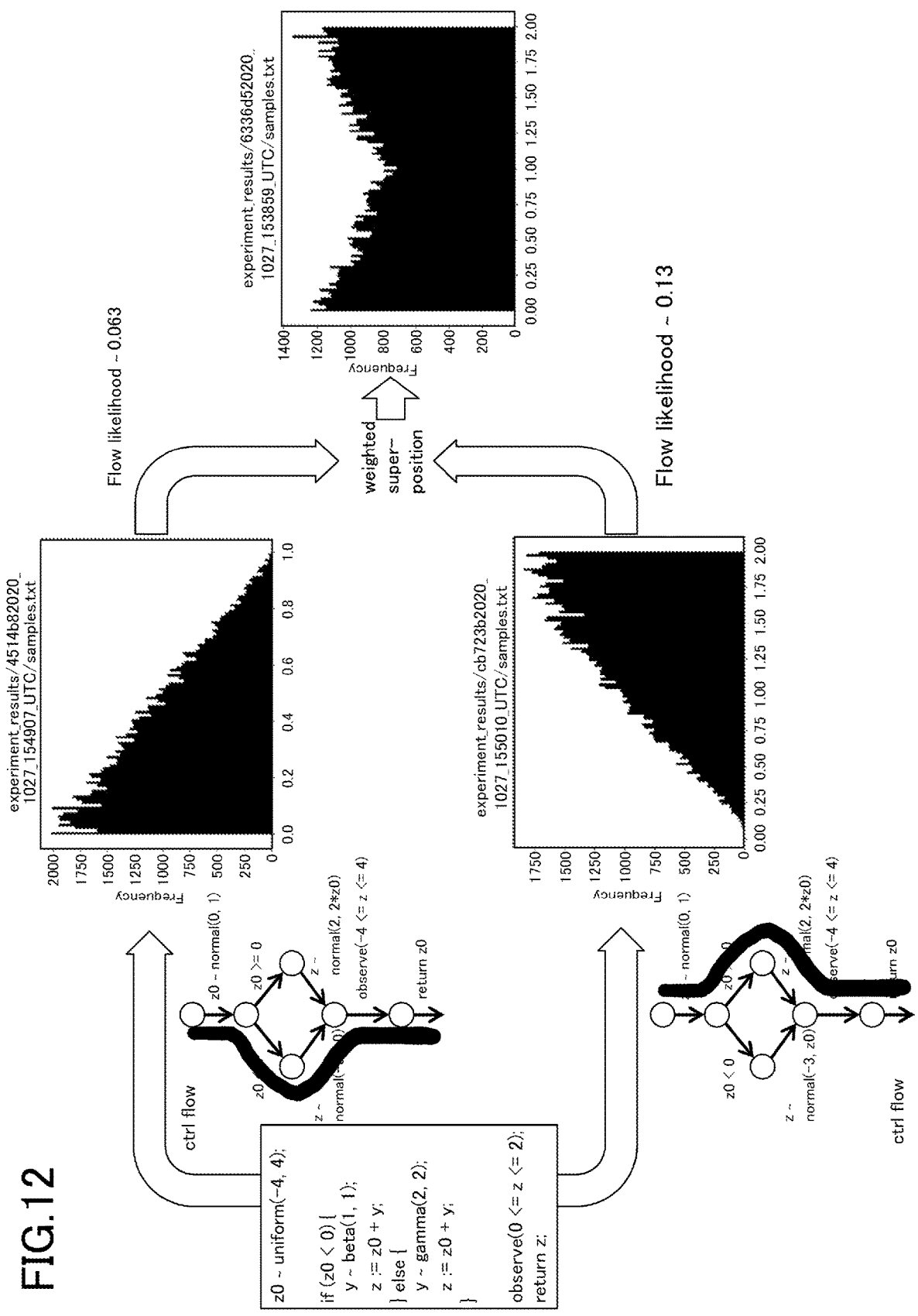
FIG. 12 is a schematic diagram illustrating simulation results according to one embodiment in the present disclosure.

For example, as illustrated in FIG. 12, by simulation, the likelihood of the sample generated from the control flow 1 was 0.063, and the likelihood of the sample generated from the control flow 2 was 0.13. By superimposing the samples generated from the control flows 1 and 2, a distribution of the samples as illustrated in the figure can be obtained.

Note that in the probabilistic program described above, the control flow is extracted based on an if statement. However, the present disclosure is not limited as such, and a control flow may be extracted based on a while statement as a control structure of a branch. For example, the present disclosure may be applied to a probabilistic program as illustrated in FIG. 13. For example, a control flow may be extracted according to the loop count of the while loop. In other words, a serial program when the while loop is executed once, a serial program when the while loop is executed twice, . . . , and a serial program when the while loop is executed n times are extracted respectively, and the program optimization and sampling process described above are executed on the extracted serial programs.

[Sampling Process]

Figure 14:
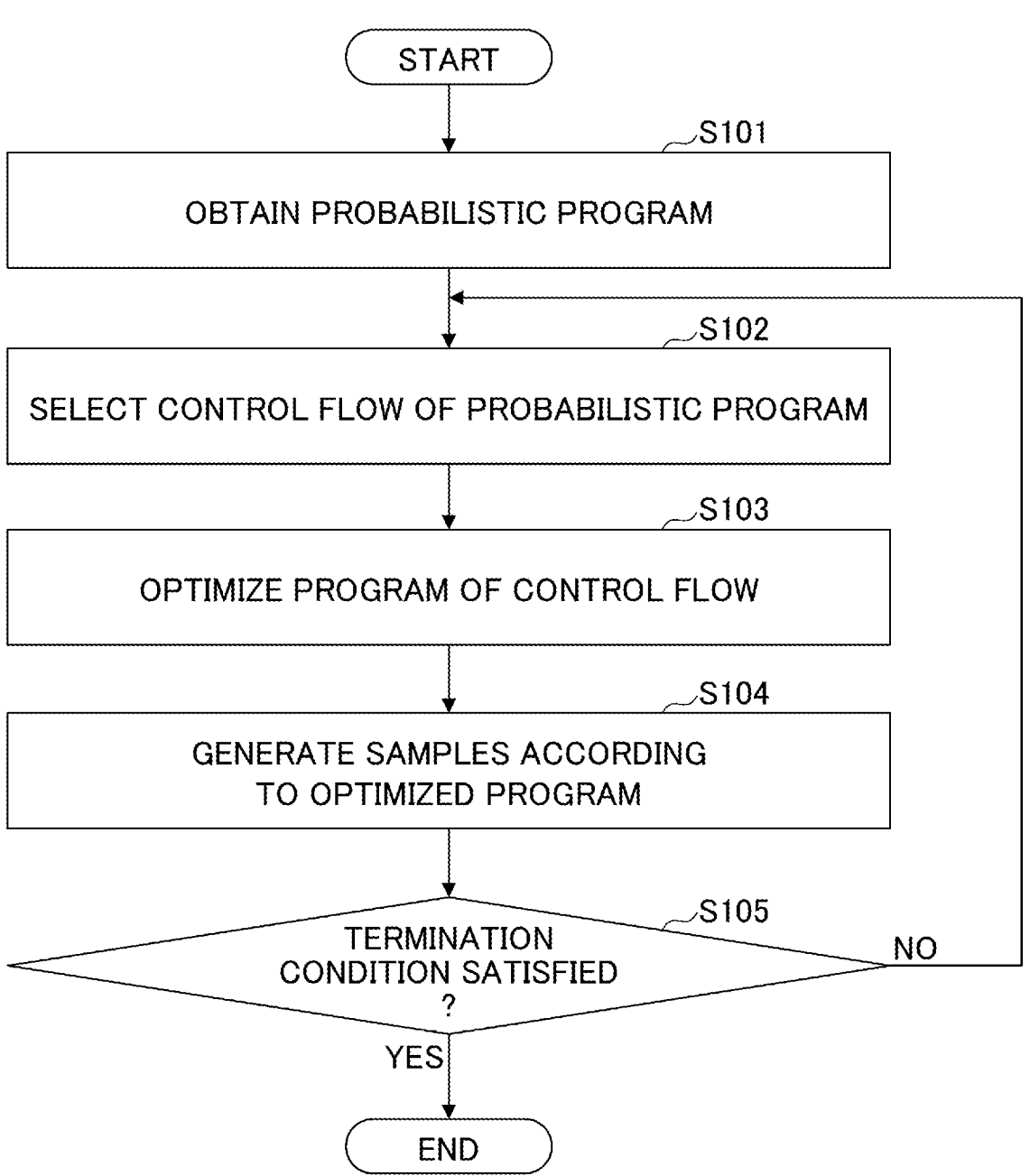
FIG. 14 is a flow chart illustrating a sampling process according to one embodiment in the present disclosure.

Next, with reference to FIG. 14, a sampling process according to one embodiment in the present disclosure will be described. The sampling process is executed by the sampling device 100 described above, and may be implemented by, for example, one or more processors executing a program stored in one or more memories of the sampling device 100. FIG. 14 is a flow chart illustrating a sampling process according to one embodiment in the present disclosure.

As illustrated in FIG. 14, at Step S101, the sampling device 100 obtains a probabilistic program. Specifically, the sampling device 100 obtains a probabilistic program to implement Bayesian inference.

At Step S102, the sampling device 100 selects a control flow corresponding to one of the branches of the probabilistic program. Specifically, the sampling device 100 extracts control flows corresponding to the respective branches of an if statement of the obtained probabilistic program, and selects a control flow to be processed from among the extracted control flows. Further, the sampling device 100 extracts a serial program corresponding to the selected control flow.

At Step S103, the sampling device 100 optimize the program, by applying the predetermined transformation rules to the program of the selected control flow by back propagation. Specifically, the sampling device 100 applies the predetermined transformation rules to each line in a direction opposite to the processing order of the serial program of the selected control flow, to transform the serial program. The optimized program excludes samples that do not logically contribute to calculation of the output of the serial program in advance.

At Step S104, the sampling device 100 generates samples according to the optimized program. Specifically, the sampling device 100 executes the optimized program repeatedly, generates a predetermined number of samples, and stores the generated samples. In addition, the sampling device 100 calculates the likelihood of each control flow for the stored samples.

At Step S105, the sampling device 100 determines whether a termination condition is satisfied. The termination condition may be, for example, that Steps S101 to S104 have been executed repeatedly for a predetermined number of times.

If the termination condition is satisfied (YES at Step S105), the sampling device 100 terminates the sampling process. On the other hand, if the end condition is not satisfied (NO at Step S105), the sampling device 100 returns to Step S102, and selects the next control flow.

The sampling device 100 and the sampling process described above may be applied to, for example, sampling for testing an automatic driving system. In other words, events such as accidents generally do not occur with a high probability. For example, an event X in 'observe(X)' to be analyzed is also a rare event, and most of the samples collected in sampling for analyzing the event are highly likely to be discarded. By using the sampling method in the present disclosure, a range in which the event X cannot logically occur can be excluded in advance, and samples suitable as the analysis targets can be generated efficiently.

As described above, the embodiments of the present invention have been described in detail; note that the present invention is not limited to the specific embodiments described above, and various modifications and changes can be made within the scope of the gist of the present invention set forth in the claims.

What is claimed is:

1. A sampling device comprising:
   a memory; and
   a processor configured to:
   transform instructions of a serial program of a probabilistic program by using an internal state in reverse order of the serial program, the internal state being determined based on an instruction to be transformed, and the serial program corresponding to each branch in the probabilistic program; and execute the transformed instructions to generate samples, wherein the generated samples (i) are executed with a randomly selected control flow or a control flow selected from among previously unselected control flows for statistical model analysis, and (ii) logically contribute to calculation of an output of the serial program, thereby improving sampling efficiency of the probabilistic program.

2. The sampling device as claimed in claim 1, wherein the processor applies the predetermined transformation rules including a restriction of an application region of a probability distribution, to the serial program.

3. The sampling device as claimed in claim 1, wherein the processor selects the serial program based on a sampling result.

4. The sampling device as claimed in claim 1, wherein the probabilistic program includes a program for implementing Bayesian inference.

5. A sampling method executed by a computer including a memory and a processor, the method comprising:

transforming instructions of a serial program of a probabilistic program by using an internal state in reverse order of the serial program, the internal state being determined based on an instruction to be transformed, and the serial program corresponding to each branch in the probabilistic program; and executing the transformed instructions to generate samples, wherein the generated samples (i) are executed with a randomly selected control flow or a control flow selected from among previously unselected control flows for statistical model analysis, and (ii) logically contribute to calculation of an output of the serial program, thereby improving sampling efficiency of the probabilistic program.

6. The sampling method as claimed in claim 5, wherein the transforming of the instructions applies the predetermined transformation rules including a restriction of an application region of a probability distribution, to the serial program.

7. The sampling method as claimed in claim 5, wherein the serial program is selected based on a sampling result.

8. The sampling method as claimed in claim 5, wherein the probabilistic program includes a program for implementing Bayesian inference.

\* \* \* \* \*